US006499872B2

(12) United States Patent
Sand (10) Patent No.: US 6,499,872 B2
(45) Date of Patent: *Dec. 31, 2002

(54) ULTRA-LEAN DILUTION APPARATUS

(75) Inventor: William F. Sand, Cincinnati, OH (US)

(73) Assignee: Hydro Systems Company, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/832,477

(22) Filed: Apr. 11, 2001

(65) Prior Publication Data

US 2001/0015231 A1 Aug. 23, 2001

Related U.S. Application Data

(62) Division of application No. 09/274,126, filed on Mar. 23, 1999, now Pat. No. 6,238,081.

(51) Int. Cl.⁷ .................................................. B01F 15/02
(52) U.S. Cl. ............................... 366/160.1; 366/163.2; 366/182.4
(58) Field of Search ........................... 366/160.1, 160.5, 366/162.1, 163.2, 176.1, 176.2, 181.5, 182.1, 182.4, 336, 340; 251/126, 127; 138/40, 42, 43; 222/71, 145.7, 564; 137/552, 552.5, 556, 888, 892, 893; 239/542, 555, 596

(56) References Cited

U.S. PATENT DOCUMENTS

| 1,234,251 A | 7/1917 | Zorzytzki |
| 1,964,300 A | 6/1934 | Perry et al. |
| 2,021,079 A | 11/1935 | Mittendorf et al. |
| 2,835,533 A | 5/1958 | Baker |
| 3,532,126 A | 10/1970 | Boothe |
| 3,532,127 A | 10/1970 | Vogelsang et al. |
| 3,791,587 A | 2/1974 | Drori |
| 3,998,391 A | 12/1976 | Lemelshtrich |
| 3,998,427 A | 12/1976 | Bentley |

(List continued on next page.)

Primary Examiner—Charles E. Cooley
(74) Attorney, Agent, or Firm—Wood, Herron & Evans LLP (57) ABSTRACT

An ultra-lean dilution apparatus is provided for proportioning minute quantities of a first fluid, such as a concentrated cleaning solution, for mixing into a second fluid, such as tap water, which provides improved performance and which can be manufactured by assembling several molded components with little or no machining. The dilution apparatus (20) provides a selective pressure drop in a conduit (22) by including a plurality of dilution disks (50a–50f), each dilution disk (50a–50f) having a tortuous path (52a–52f) of sufficient cross-sectional area to be resistant to clogging and having a sufficient number of sharp turns to create a desired pressure drop. While each disk (50a–50f) produces a predetermined drop, the serial configuration of the tortuous paths of the plurality of dilution disks is additive to produce a range of dilution suitable for the chemicals used. Advantageously, the tortuous path of a first of the plurality of dilution disks (50a) is recessed into a front face so that bringing the front face (54a) of the first dilution disk (50a) in contact with a back face (55b) of a second dilution disk (50b) completes the tortuous path (52a). Furthermore, a blind intake (58a) of the tortuous path (52a) of the first dilution disk (50a–50f) selectively communicates with an output port (56b) of another tortuous path (52b) on a front face (54b) the second dilution disk (50b).

21 Claims, 8 Drawing Sheets

U.S. PATENT DOCUMENTS

| | | |
|---|---|---|
| 4,008,853 A | 2/1977 | Tregillus |
| 4,060,200 A | 11/1977 | Mehoudar |
| 4,105,162 A | 8/1978 | Drori |
| 4,215,822 A | 8/1980 | Mehoudar |
| 4,226,368 A | 10/1980 | Hunter |
| 4,267,045 A | 5/1981 | Hoof |
| 4,349,157 A | 9/1982 | Beiswenger et al. |
| 4,369,921 A | 1/1983 | Beiswenger et al. |
| 4,392,616 A | 7/1983 | Olson |
| 4,533,083 A | 8/1985 | Tucker |
| 4,676,657 A | 6/1987 | Botrie |
| 4,718,608 A | 1/1988 | Mehoudar |
| 4,738,665 A | 4/1988 | Shepard |
| 4,817,875 A | 4/1989 | Karmeli et al. |
| 4,850,531 A | 7/1989 | Littleton |
| 4,917,687 A | 4/1990 | O'Boyle |
| 5,031,837 A | 7/1991 | Hanish |
| 5,052,625 A | 10/1991 | Ruskin |
| 5,106,021 A | 4/1992 | Gilead |
| 5,111,996 A | 5/1992 | Eckstein |
| 5,159,958 A * | 11/1992 | Sand |
| 5,253,677 A * | 10/1993 | Sand |
| 5,316,220 A | 5/1994 | Dinur |
| 5,413,282 A | 5/1995 | Boswell |
| 5,522,419 A * | 6/1996 | Sand |
| 5,615,838 A | 4/1997 | Eckstein et al. |
| 5,803,368 A | 9/1998 | Shekalim |
| 5,862,829 A * | 1/1999 | Sand |

\* cited by examiner

ULTRA-LEAN DILUTION APPARATUS

This is a divisional of U.S. patent application Ser. No. 09/274,126 filed Mar. 23, 1999, now U.S. Pat. No. 6,238,081 and which is expressly incorporated herein by reference.

BACKGROUND OF THE INVENTION

1. Field of the Invention

This invention relates to devices for dispensing and mixing liquids, and more particularly to such devices that dispense and mix chemicals, and even more particularly to devices that dispense and mix cleaning chemicals.

2. Prior Art

It is common practice to purchase concentrated cleaning chemicals and to mix them with other liquids such as water to achieve the desired usage concentration for cleaning. A variety of proportioning dispensers have been developed to achieve this. The dispensers often employ venturi-type devices sometimes called eductors to draw the concentrated liquid chemical and mix it with the water stream. Examples of such eductors include the Sand U.S. Pat. Nos. 5,522,419, 5,253,677 5,159,958, and 5,862,829 all of which are assigned to the Assignee of the present invention and are expressly incorporated herein. Water traveling through the central, constricted portion of the venturi creates suction which draws the concentrated liquid chemical into the water stream.

The structure of such eductors is generally fixed, and thus, for a given water stream flow rate, the amount of concentrated liquid chemical drawn is a function of the fluid resistance in the flow path of the concentrated liquid chemical. Adjusting the amount of chemical educted is generally controlled by a metering orifice interposed into the flow path of the concentrated liquid chemical. Such orifices may be fixed or adjustable to vary the proportionate flow. Achieving the proper proportion of chemical merely with selection of a metering orifice is complicated by factors which vary per the application, such as the desired usage concentration, the viscosity of the concentrated liquid chemical, and the pressures at which the liquids are provided. Using metering orifices to control dilution means that very small metering orifice sizes are required, as shown in Table 1.

TABLE 1

Approximate Dilutions at 40 psi for Water-Thin Products (1.0 cp)

| Orifice Size (inch) | Standard Drill Number | Ratio (per Eductor Flow) | |
|---|---|---|---|
| | | 1 G.P.M. | 3.5 G.P.M. |
| 0.187 | (3/16) | 3:1 | 3.5:1 |
| 0.128 | (30) | 3:1 | 4:1 |
| 0.098 | (40) | 3:1 | 4:1 |
| 0.070 | (50) | 4:1 | 8:1 |
| 0.052 | (55) | 5:1 | 14:1 |
| 0.043 | (57) | 7:1 | 20:1 |
| 0.040 | (60) | 8:1 | 24:1 |
| 0.035 | (65) | 10:1 | 30:1 |
| 0.028 | (70) | 16:1 | 45:1 |
| 0.025 | (72) | 20:1 | 56:1 |
| 0.023 | (74) | 24:1 | 64:1 |
| 0.020 | (76) | 32:1 | 90:1 |
| 0.018 | (77) | 38:1 | 128:1 |
| 0.014 | (79) | 64:1 | 180:1 |
| 0.010 | (87) | 128:1 | 350:1 |

Metering orifices generally achieve dilution ratios of 2:1 to 300:1. More dilute mixtures are constrained by the volume rate of water available and by the smallest practical size of the metering orifices. Very small orifices are susceptible to clogging such as from contaminant particles or artifacts in the concentrated chemicals. In addition, the viscosity of the chemical imposes a size limitation. Introducing a fixed pressure drop to the overall dimensioning of the chemical feed line, or supply conduit, to achieve more dilute concentrations would preclude applications requiring less dilute concentrations.

Active devices which could monitor the relative amount of liquids being mixed and control dispensing are impractical as being uneconomical, increasing the cost of producing the dispenser. Moreover, providing such active devices with a power supply such as batteries or an electrical outlet is generally uneconomical or inconvenient. Moreover, dispensing devices often dispense conductive or corrosive materials that would further complicate protection of electronic components of an active system. Consequently, passive dispensing devices are generally used, even though this constrains the range of achievable usage concentrations.

Consequently, appropriate chemicals for dispensing are not concentrated as much as would be desirable, imposing additional costs of shipment. Dispensing devices for such less-concentrated liquid chemicals are thus required to have provisions for larger storage of chemicals and/or more frequent refills. In addition, at the more dilute end of the generally achievable range of operation, the metering orifice is susceptible to clogging, allowing defective mixtures to be generated. Moreover, certain types of chemicals that tend to have suspended solids are precluded from being dispensed at all by such devices.

SUMMARY OF THE INVENTION

Accordingly, it is an object of the present invention to provide an ultra-lean dilution apparatus for proportioning minute quantities of a first fluid, such as a concentrated cleaning solution, for mixing into a second fluid, such as tap water, which provides improved performance and which can be manufactured by assembling several molded components with little or no machining.

According to the principles of the present invention and in accordance with the described embodiments, the present invention provides a dilution apparatus for providing a selective pressure drop in a conduit by including a plurality of dilution disks, each dilution disk acting as a channel carrier by including a tortuous path of sufficient cross-sectional area to be resistant to clogging and having a sufficient number of sharp turns to create a desired pressure drop.

For ultra-lean dilutions of 350:1 to 1500:1, using metering orifices would require openings smaller than 0.010 inches in diameter. Yet in this range many particles or artifacts in chemicals may clog them. Thus, such metering orifices are generally not used. On the other hand, the disk channel formed herein from a plurality of tortuous paths would be several time larger than 0.010, as shown in three illustrative examples in Table 2. Thus, the channel is of a size to pass such particles or artifacts which would otherwise clog orifices in at least part of the noted range yet still produce the pressure drop necessary to produce the ultra-lean proportion.

TABLE 2

| | oz per minute | Ratio at 1 GPM | Ratio at 4 GPM |
|---|---|---|---|
| Black (Large passage: 0.033" × 0.033" cross-section) full path length | | | |
| 5 discs | 0.486 | 263 | 1053 |
| 4 discs | 0.551 | 232 | 929 |
| 3 discs | 0.647 | 197 | 791 |
| 2 discs | 0.876 | 146 | 584 |
| 1 disc | 1.299 | 98 | 394 |
| Red (Medium passage: 0.028" × 0.028" cross-section) full path length | | | |
| 5 discs | 0.331 | 386 | 1547 |
| 4 discs | 0.375 | 341 | 1365 |
| 3 discs | 0.462 | 277 | 1108 |
| 2 discs | 0.607 | 210 | 843 |
| 1 disc | 0.936 | 136 | 547 |
| Green (Small passage: 0.025" × 0.025" cross-section) full path length | | | |
| 5 discs | 0.231 | 554 | 2216 |
| 4 discs | 0.291 | 440 | 1759 |
| 3 discs | 0.382 | 335 | 1340 |
| 2 discs | 0.502 | 255 | 1020 |
| 1 disc | 0.801 | 160 | 639 |
| Green (Small passage: 0.025" × 0.025" cross-section) half path length | | | |
| 5 discs | 0.601 | 213 | 852 |
| 4 discs | 0.792 | 162 | 646 |
| 3 discs | 0.914 | 140 | 560 |
| 2 discs | 1.237 | 103 | 414 |
| 1 disc | 1.77 | 72 | 289 |

While each disk produces a predetermined drop, the serial configuration of the tortuous paths of the plurality of dilution disks is additive to produce a range of dilution suitable for the chemicals used. In other words, disks are selectively inserted or withdrawn from the circuit to vary the pressure drop between the concentrated chemical and the carrier fluid and so vary the proportion of the mix.

In one embodiment of the invention, the tortuous path of a first of the plurality of dilution disks is recessed into a front face so that bringing the front face of the first dilution disk in contact with a back face of a second dilution disk completes the tortuous path. Furthermore, a blind intake of the tortuous path of the second dilution disk selectively communicates with an output port of another tortuous path on a front face of the first dilution disk.

In a further aspect of the invention, the desired pressure drop across the dilution apparatus is selectable by adding additional dilution disks and/or by varying the length and multiplicity of turns included in the tortuous path.

For example, given a predetermined number of dilution disks with a given tortuous path characteristic, a user selectable dilution control is provided by including a bypass for one or more pairs of dilution disks. More particularly, an output port and a blind intake are provided on each dilution disk, such that in an engaged position the output port and the blind intake of one dilution disk aligns respectively to a downstream blind intake and an upstream output port, placing the tortuous path in series. Furthermore, the dilution disk has a bypass position such that the upstream output port communicates via the intervening output port of the interposed dilution disk with the downstream blind intake without going through the tortuous path.

In yet a further aspect of the invention, a stack of dilution disks molded from economical elastomeric material are compressed together within an engagable housing including a window access for selectively positioning or rotating each disk into or out of the fluid circuit and to verify the setting of each disk, wherein, once engaged, the housing locks the disks into position. Advantageously provided are a positioning tab and an alignment tab, both peripherally located on each disk. The positioning tab allows for rotatably positioning, and verifying the position, of each disk within the window of the housing. The alignment tab cooperates with an alignment groove within the housing to constrain the range of rotation of each disk such that the two rotation extremes allowed correspond to an engaged and a bypass position for the disk.

In an additional aspect of the invention, a dilution reference is provided to indicate the relative dilution ratio based on the position of the positioning tabs.

In yet another aspect of the invention, a rotatable dilution disk is separated from another rotatable dilution disk by a fixed dilution disk, wherein the respective alignment tab is substantially constrained by the alignment groove of the housing. Movement of a rotatable dilution disk is thus prevented from inadvertently moving other rotatable dilution disks.

BRIEF DESCRIPTION OF THE DRAWINGS

The accompanying drawings, which are incorporated in and constitute a part of this specification, illustrate embodiments of the invention, and together with the general description of the invention given above, and the detailed description of the embodiments given below, serve to explain the principles of the present invention.

DETAILED DESCRIPTION OF THE INVENTION

Figure 1:
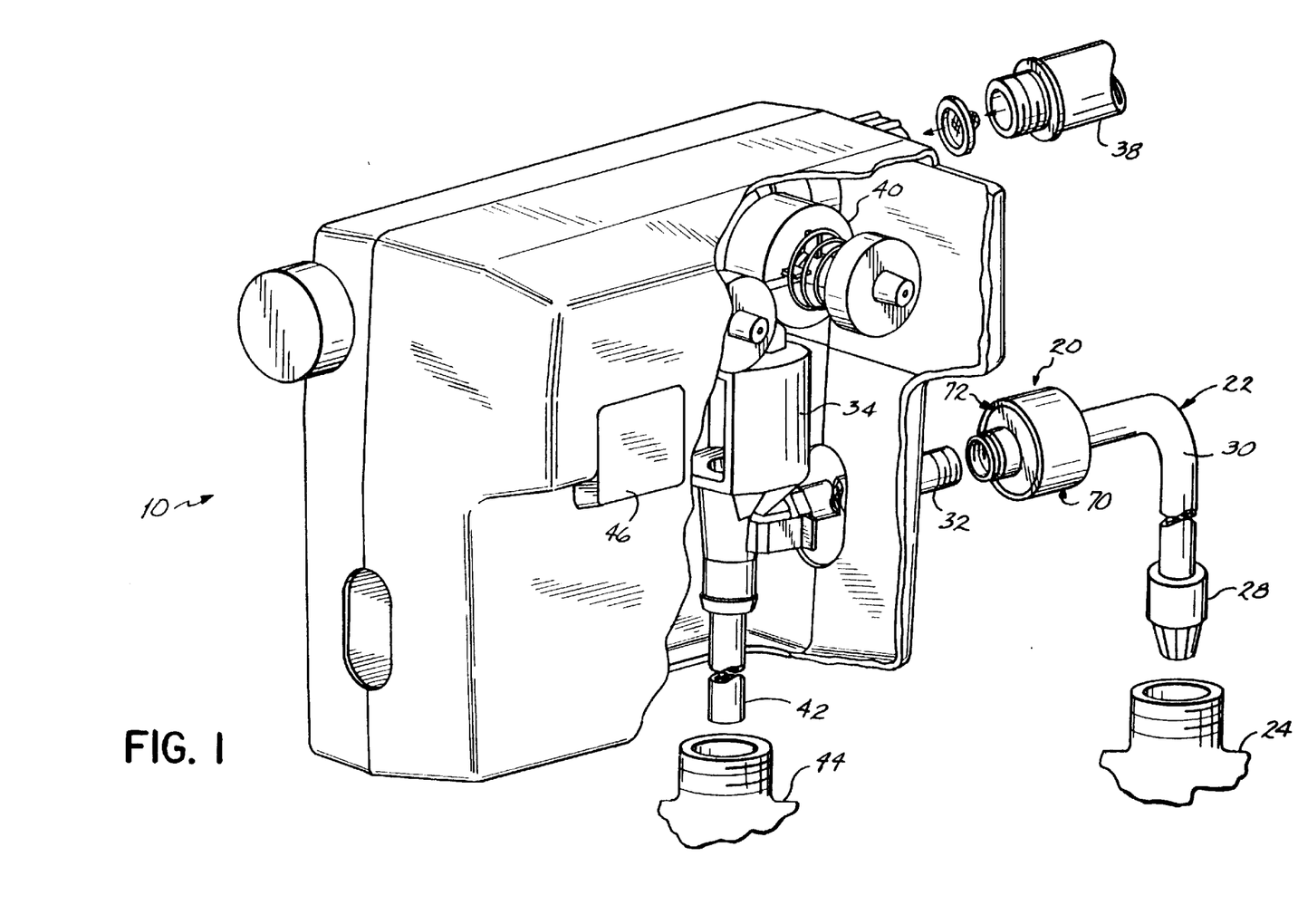
FIG. 1 is an illustration of a dispensing system incorporating an ultra-lean dilution apparatus for proportioning a first fluid, such as a concentrated cleaning solution.

Referring to FIG. 1, a dispensing system 10, also referred to as a proportioner unit, is shown incorporating an ultra-lean dilution apparatus 20 for proportioning a first fluid, a concentrated liquid chemical such as a cleaning solution. The dilution apparatus 20 meters the flow of concentrated liquid chemical from a concentrated liquid reservoir 24 into a carrier stream such as water by selectively controlling the pressure drop in a supply conduit 22. Flow from the concentrated liquid reservoir 24 passes through a foot valve 28, which minimizes back flow, through tubing 30 to the dilution apparatus 20. After the flow is metered by the dilution apparatus 20, flow continues through eductor tubing 32 to an air gap eductor 34, such as described in the aforementioned U.S. Pat. Nos. 5,522,419, 5,253,677 5,159,958, and 5,862,829. Thus, conduit 22 is shown as including the foot valve 28, tubing 30, dilution apparatus 20, and eductor tubing 32.

The eductor 34 provides a venturi function for mixing a second fluid, such as tap water, with the concentrated liquid chemical. Thus, a pressurized liquid carrier source is provided, such as the depicted water hose 38 operatively coupled with a tap water supply (not shown), typically at 40 psi. A valve 40 controls the flow through the dispensing system 10. The flow from the valve 40 passes through the eductor 34. Within the eductor 34, a constriction (not shown) produces a venturi effect, such that for 40 psi dynamic pressure the eductor creates about 28 in-hg vacuum. This vacuum draws a relatively small amount of concentrated liquid chemical into the flow at the constriction. Thereafter, the usage concentration flow, formed by mixing the regulated flow with the concentrated liquid chemical, passes through a discharge tube 42 to a bottle 44. The dispensing system 10 includes a button 46 to enable flow through the dispensing system 10 when a user chooses to fill the bottle 44.

Figure 2:
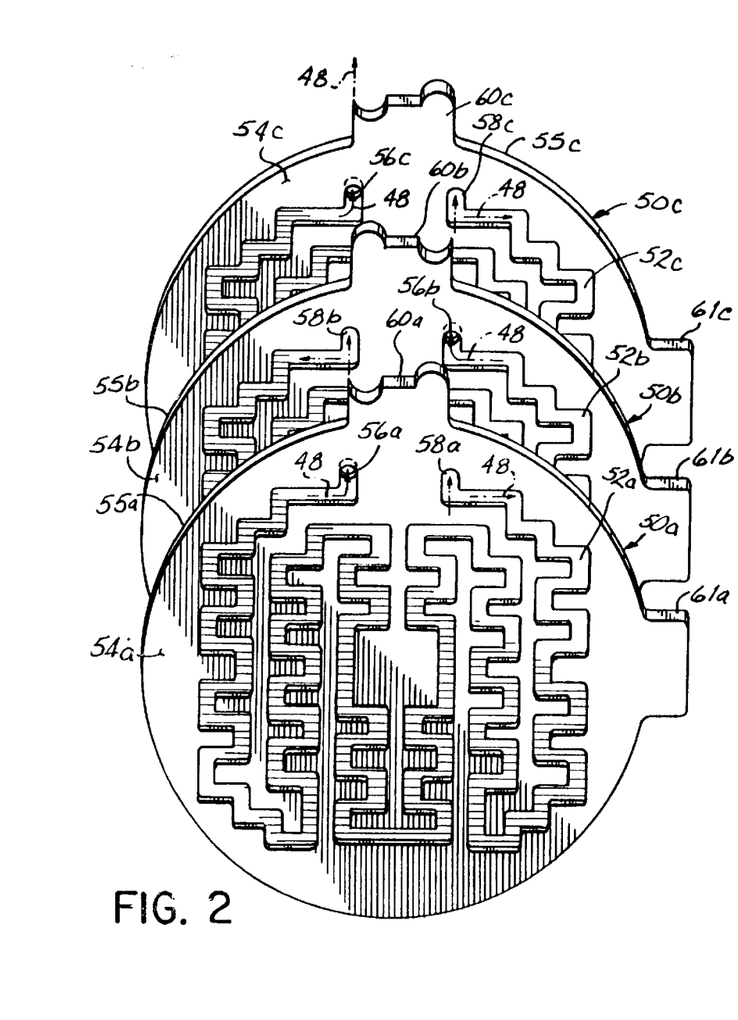
FIG. 2 is an exploded view of a plurality of three dilution disks, components of the ultra-lean dilution apparatus of FIG. 1, illustrating a flow path serially through a plurality of tortuous paths forming a channel.

Referring to FIG. 2, a plurality of dilution disks 50a–50c are shown in an exploded view to illustrate a serial flow 48 through the plurality of dilution disks 50a–50c. Each dilution disk 50a–50c includes a respective tortuous path 52a–52c on a respective upstream, front face 54a–54c, each tortuous path 52a–52c including a multiplicity of sharp turns to create a pressure drop in the serial flow 48 while maintaining a sufficient cross-sectional area of serial flow 48 to reduce clogging. Each tortuous path 52a–52c is closed when brought into contact with another surface, such as the upstream, back face 55a–55c of another dilution disk 50a–50c.

Each tortuous path 52a–52c includes an output port 56a–56c passing through the respective dilution disk 50a–50c to communicate with the downstream portion of the dilution apparatus 20. Each tortuous path 52a–52c begins in a blind intake 58a–58c, respectively, each positioned to align with an upstream portion of the dilution apparatus 20, such as blind intake 58b communicating with output port 56a. Achieving this alignment is provided by mirror image tortuous paths. Thus, dilution disk 50a has blind intake 58a counterclockwise from output port 56a with serial flow 48 generally clockwise through tortuous path 52a. Then, the adjacent, mirror-image dilution disk 50b has output port 56b clockwise from blind intake 58b with serial flow 48 generally counterclockwise through tortuous path 52b. Then, the adjacent dilution disk 50c is shown as the same as dilution disk 50a.

Positioning the plurality of dilution disks 50a–50c is advantageously assisted with positioning tabs 60a–60c and alignment tabs 61a–61c, shown extending peripherally respectively from each dilution disk 50a–50c, which will be discussed in more detail below.

The dilution disks 50a–50c are advantageously molded from an elastomeric material such as polyethylene or other preferably chemically resistant material, providing economical manufacture as well as providing flexibility to sealably conform to adjacent dilution disks 50a–50c when assembled.

Figure 3:
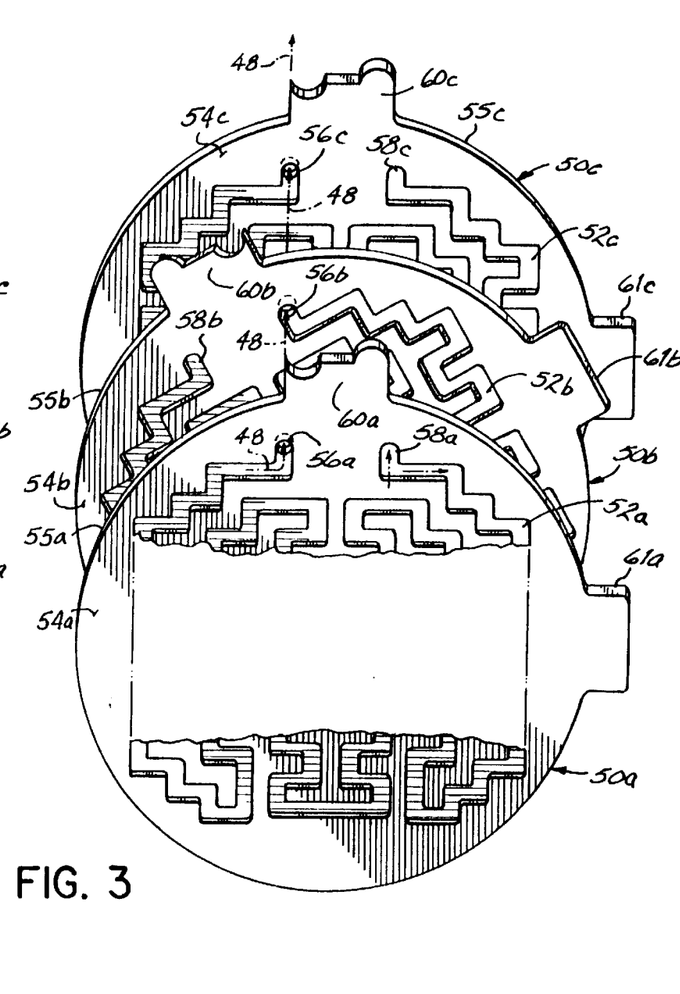
FIG. 3 is an exploded view of the plurality of three dilution disks of FIG. 2 illustrating how the flow path serially through a plurality of tortuous paths may be selectively shortened by rotating a dilution disk from an engaged position to a bypass position.

Referring to FIG. 3, a disassembled perspective view of the plurality of three dilution disks of FIG. 2 are shown oriented such that dilution disks 50a and 50b are bypassed, selectively shortening the length of the serial flow 48 and reducing the number of sharp turns encountered. The bypass position is achieved by rotating dilution disk 50b about its center, such as by positioning tab 60b counterclockwise until output port 56b aligns with the two adjacent output ports 56a, 56c. Thus, tortuous paths 52a and 52b are not utilized by the serial flow 48.

Figure 4:
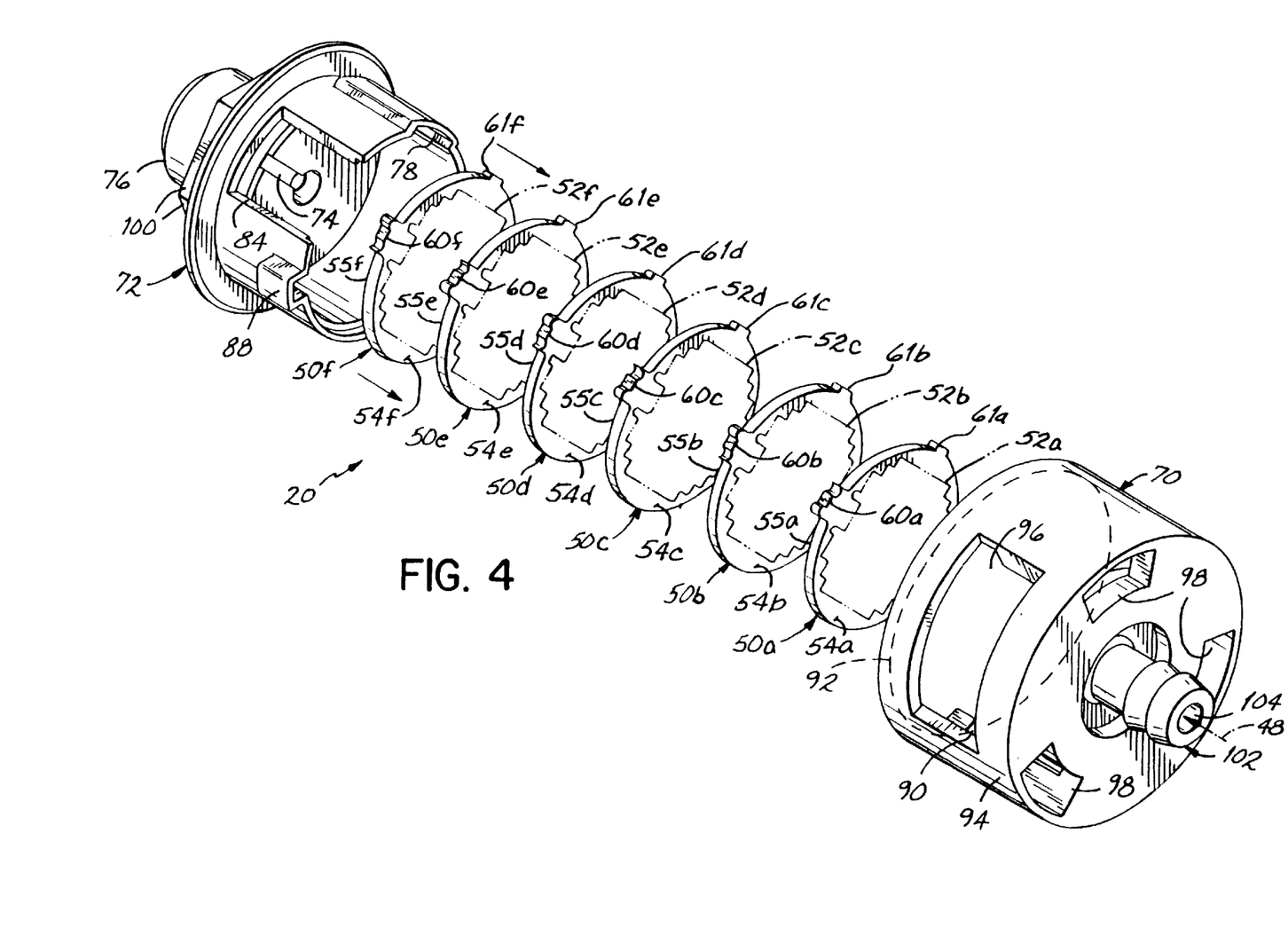
FIG. 4 a disassembled perspective view of a dilution apparatus including a stack of six dilution disks and a housing assembly.

Referring to FIG. 4, an exploded view of a dilution apparatus 20 is shown including a stack of six dilution disks 50a–50f and a housing assembly 70. When assembled, the dilution disks 50a–50f are radially encompassed by an open ended, generally cylindrical inner housing 72 which includes a discharge path 74 communicating between dilution disk 50f and discharge connector 76.

Inner housing 72 includes departures from a cylindrical shape, including an alignment groove 78 which cooperates with alignment tabs 61a–61f peripherally located respectively on each dilution disk 50a–50f to constrain the range of rotation available to the dilution disks 50a–50f. Thus, a dilution disk 50a–50f is placed in a bypass position, such as shown in FIG. 3, when a respective alignment tab 61a–61f reaches the extreme counterclockwise position allowed by alignment groove 78. Similarly, proper alignment to an engaged position is achieved when at the extreme clockwise position. Inner housing 72 also includes a cutaway 84 which allows exposing positioning tabs 60a–60f on each dilution disk 50a–50f respectively to verify and/or manipulate the position of each dilution disk 50a–50f. Moreover, the combination of cutaway 84 and alignment groove 78 on inner housing 72 with positioning tabs 60a–60f and alignment tabs 61a–61f advantageously ensures that dilution disks 50a–50f are not assembled backwards.

The inner housing 72 also includes a locking portion 88 which rotationally engages within a locking detent 90 within a cylindrical opening 92 of an outer housing 94 of the housing assembly 70. The outer housing 94 also includes a window 96 to expose the cutaway 84, and hence the positioning tabs 60a–60f. The window 96 advantageously also exposes locking portion 88 to visually confirm whether engaging the locking detent or not, as shown in more detail in FIG. 6.

The housing assembly 70 also includes features to assist in assembly, especially when tools are required to sufficiently compress the dilution disks 50a–50f, such as apertures 98 on the base of the outer housing 94 and wrench engaging surfaces 100 on the inner housing 72.

Figure 5:
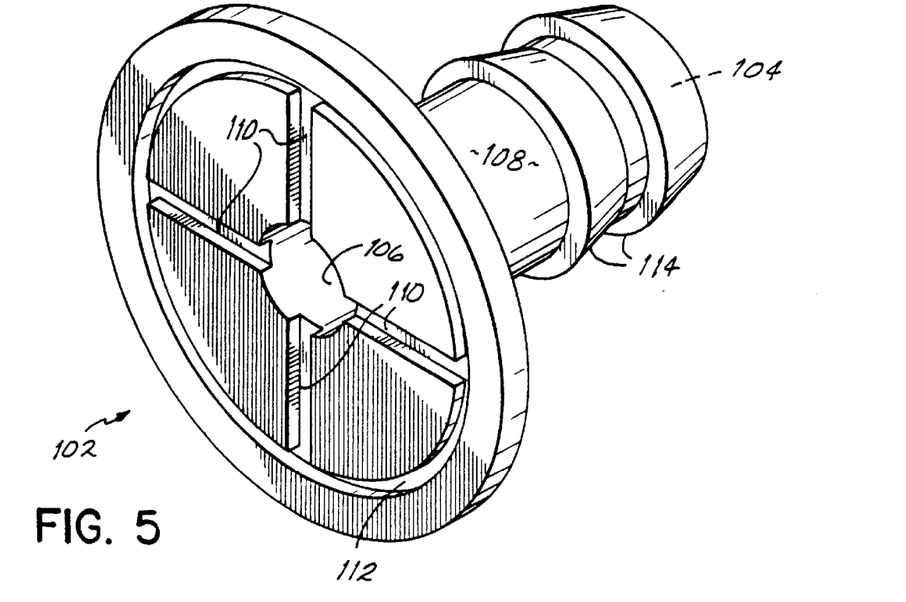
FIG. 5 is a perspective view of the inlet body, including a hose barb, of the housing assembly shown in FIG. 4, illustrating flow path communication from a dilution disk to the exterior of the housing assembly.

Referring to FIGS. 4 and 5, an inlet body 102 provides for flow communication between an intake portion 104 of the dilution device 20, through a centerline discharge path 106 within a cylindrical portion 108, along channel spokes 110 to internal radial groove 112, and finally to the output port 56a of dilution disk 50a. Inlet body 102 advantageously includes a hose barb 114 to interference fit tubing 30.

Figure 6:
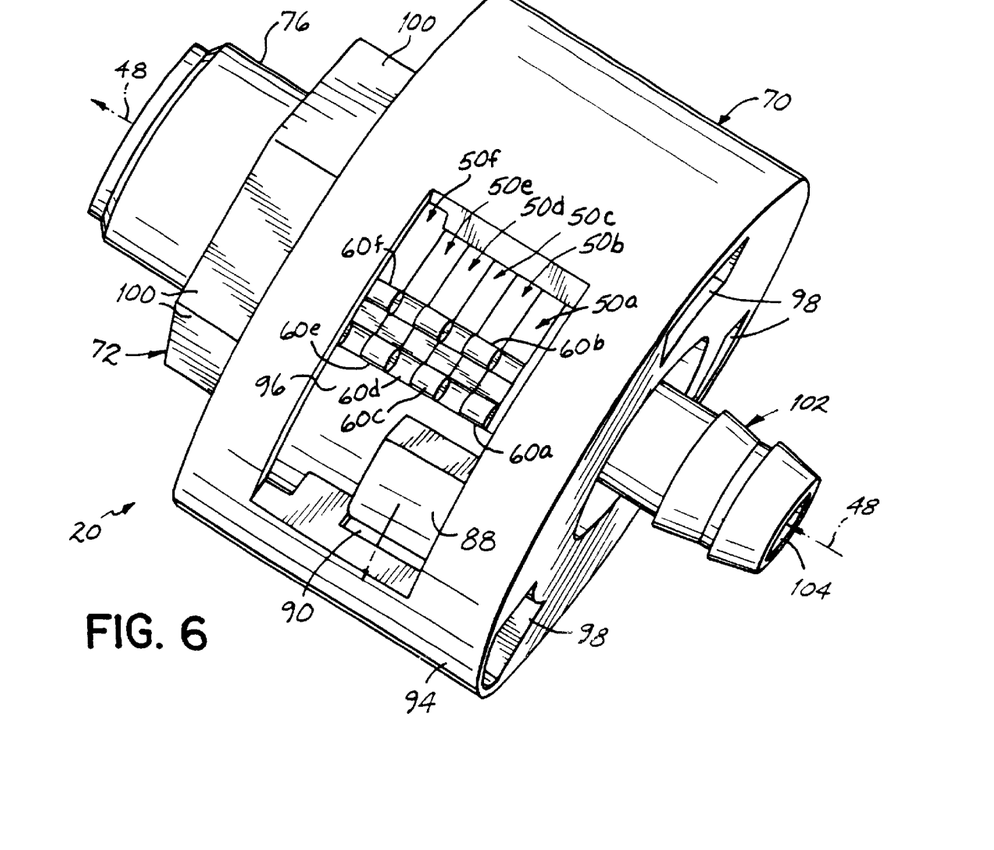
FIG. 6 is a perspective view of an assembled ultra-lean dilution apparatus of FIGS. 1 and 4, showing a window through which a user can verify the locking status of the dilution apparatus and position of the stack of dilution disks.

Referring to FIG. 6, the dilution apparatus 20 of FIG. 4 is shown assembled, with locking portion 88 being rotatably engaged to locking detent 90. Positioning tabs 60a–60f are shown aligned, with all dilution disks 50a–50f thus in the engaged position rather than bypassed. Moreover, placing positioning tabs 60a–60f against counterclockwise limit of the cutaway 84 ensures that serial flow 48 is not interrupted by a dilution disk 50a–50f being in an intermediate position with its output port 56a–56f out of communication with the preceding dilution disk 50a–50f.

Figure 7:
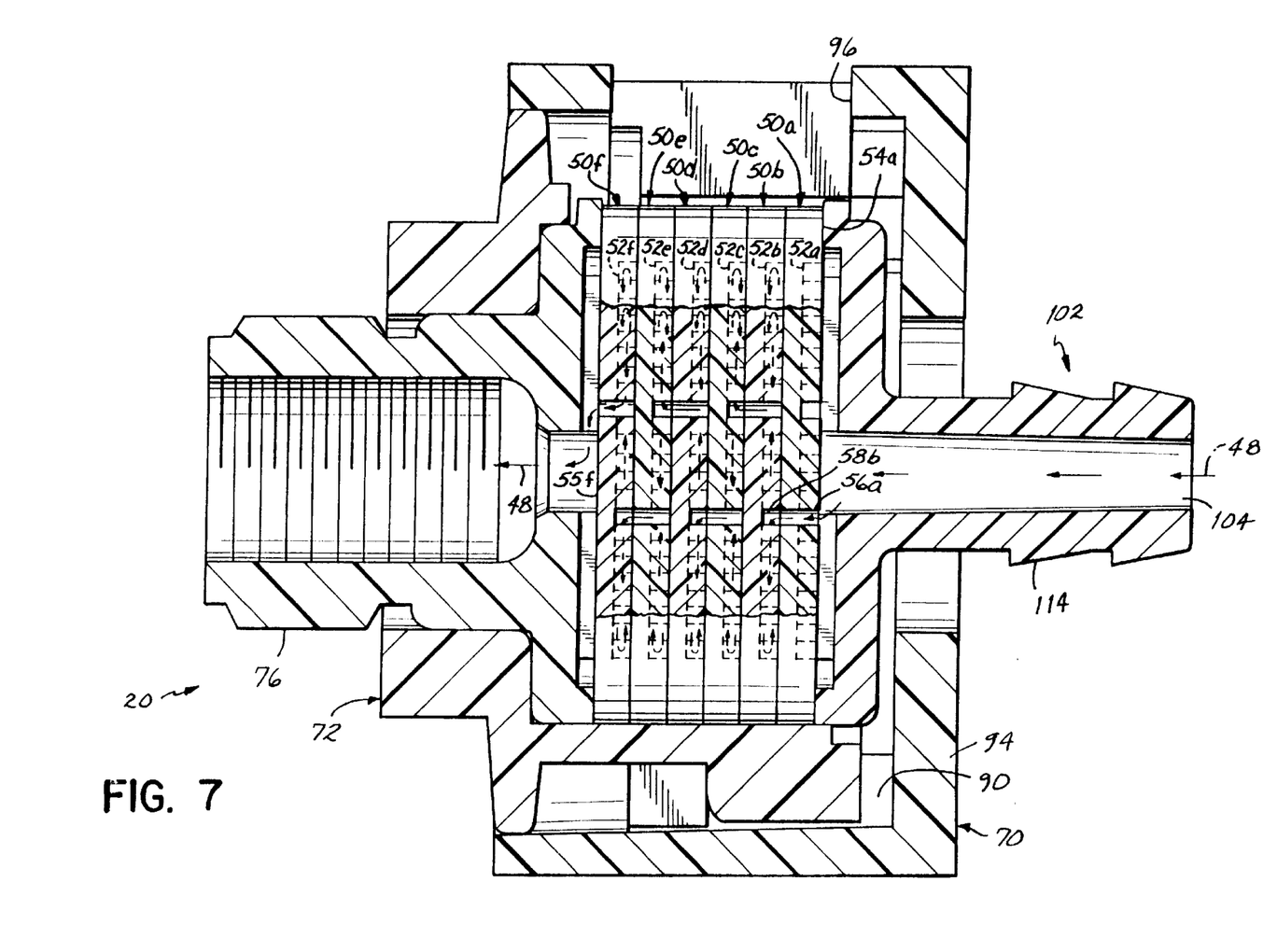
FIG. 7 is a cross-sectional view of the dilution apparatus of FIGS. 4 and 6 illustrating serial flow through the housing assembly and the stack of dilution disks.

Referring to FIG. 7, a cross-sectional view of the dilution apparatus 20 of FIGS. 4 and 6 is shown illustrating serial flow 48 through the housing assembly 70 and the stack of dilution disks 50a–50f.

Figure 8:
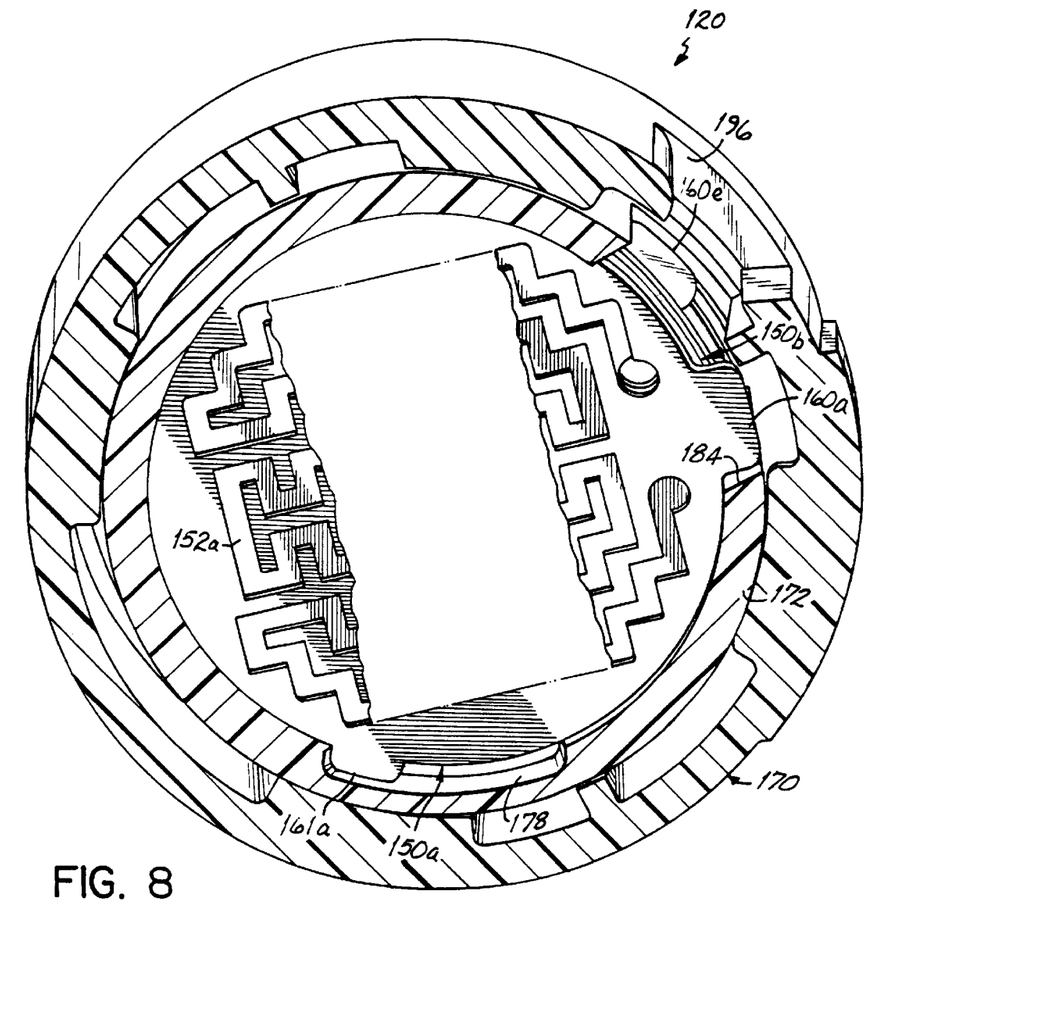
FIG. 8 is a perspective cross-sectional view of a second embodiment of alternating fixed and rotatable dilution disk shown with the stack encompassed within a housing assembly, with a cross-section chosen to expose a rotatable dilution disk outmost.
Figure 9:
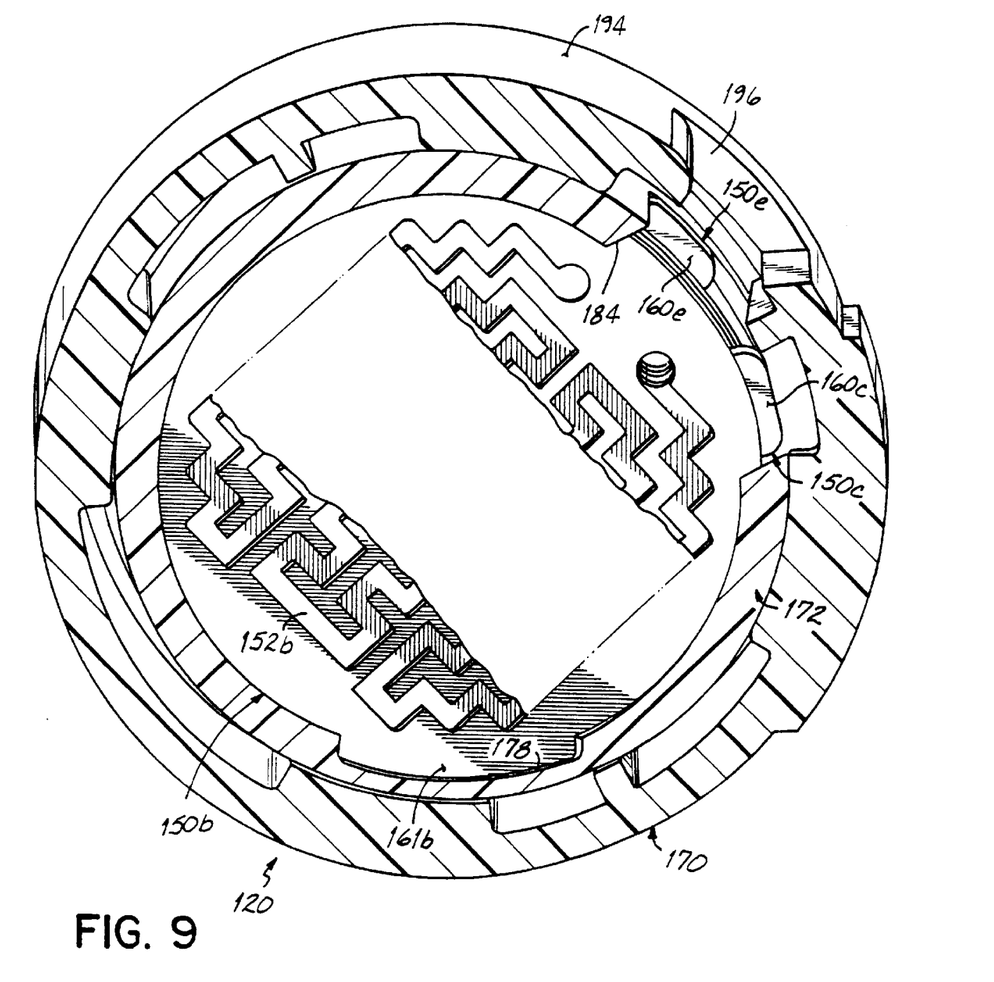
FIG. 9 is a perspective cross-sectional view of the second embodiment of FIG. 8 shown with the stack encompassed within the housing assembly, with a cross-section chosen to expose a rotatable dilution disk outmost.
Figure 10:
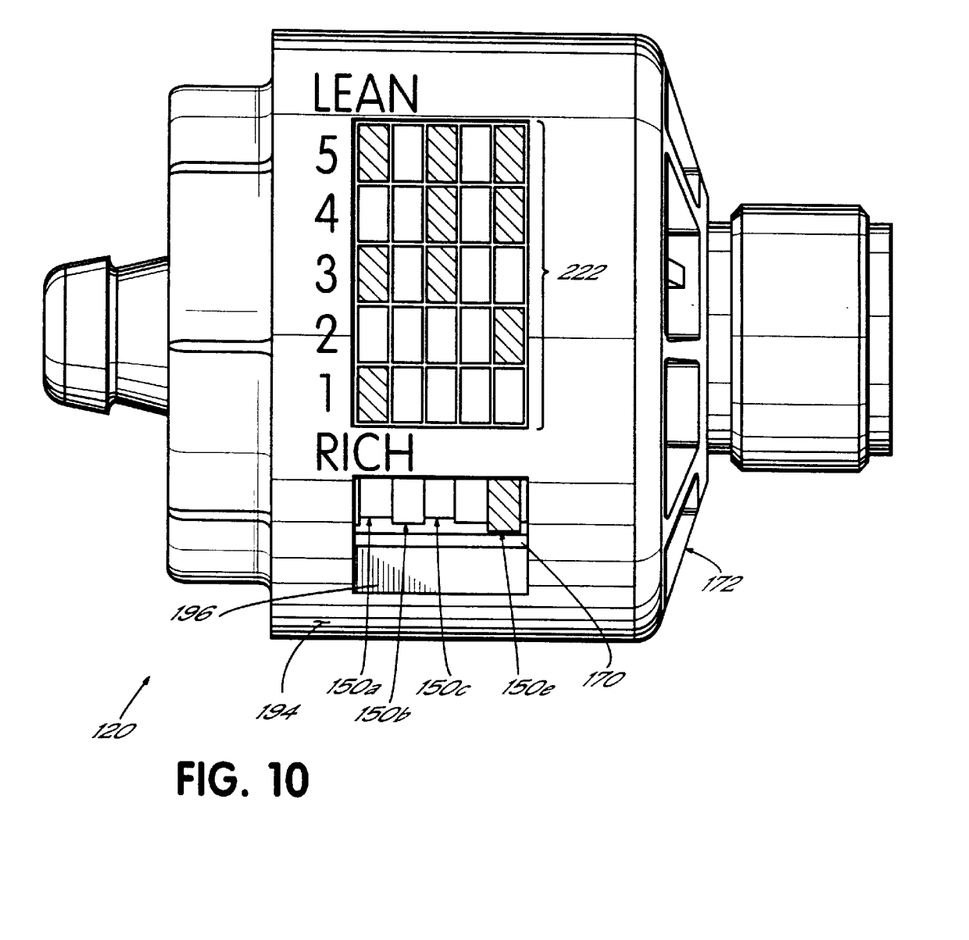
FIG. 10 is a side view of the second embodiment of FIGS. 8 and 9 showing a dilution reference chart added to the outer housing.

Referring to FIGS. 8–10, a second embodiment ultra-lean dilution apparatus 120 is shown of a five-disk stack of alternating rotatable and fixed dilution disks 150a–150e. Having fixed dilution disks advantageously prevents inadvertent rotation of adjacent dilution disks. Referring to FIG. 8, the apparatus 120 is shown with a cross-section chosen to expose the rotatable dilution disk 150a outmost with positioning tab 160a rotated clockwise. Alignment tab 161a in alignment groove 178 of the inner housing 172 constrains the rotation of disk 150a between an engaged (counterclockwise as shown) and a bypass position. Dilution disk 150a is shown having a tortuous path 152a similar to that shown for FIGS. 1–7.

Behind disk 150a is a fixed dilution disk 150b, shown in more detail in a cross-sectional view of FIG. 9, similar to FIG. 8 except exposing a different disk. Disk 150b is shown with a mirror image tortuous path 152b to previously discussed tortuous path 152a to provide for serial flow as discussed above. Alignment tab 161b is substantially constrained by alignment groove 178, preventing rotation of disk 150b.

Similarly, behind fixed dilution disk 150b are rotatable dilution disk 150c with positioning tab 160c rotated clockwise, fixed dilution disk 150d, and rotatable dilution disk 150e with positioning tab 160e rotated counterclockwise. Cutaway 184 of inner housing 172 exposes positioning tabs 160a, 160c, 160e, but only positioning tab 160e in the counterclockwise engaged position is exposed through window 196 of the outer housing 194, as also further shown in FIG. 10.

Referring to FIG. 10, a side view is shown of the second embodiment ultra-lean dilution apparatus 120. Window 196 in outer housing 194 is accompanied by a dilution reference 222 which would indicate the relative dilution depending on which position tabs 160a, 160c, 160e are visible. Reference 222 contemplates a stack of dilution disks 150a–150e such that range of dilutions are achieved from rich (less dilute) to lean (more dilute) by five combinations of rotatable dilution disks 150a, 150c, 150e in the engaged position as follows: (1) Combination 1: Disks 1 (150a); (2) Combination 2: Disk 5; (3) Combination 3: Disks 1 and 3; (4) Combination 4: Disks 3 and 5; and (5) Combination 5: Disks 1, 3 and 5. Various combinations would be possible depending upon the number of dilution disks and the characteristic of the tortuous path 150a–150e of each. For example, dilutions disks chosen from the illustrative four tortuous paths shown in Table 2 above would provide a range of dilutions, such as shown in FIG. 10. As shown in Table 2, the positioning tabs and reference 222 may advantageously be color coded to further aid in rapidly identifying the configuration.

By virtue of the foregoing, there is thus provided a dilution apparatus 20 for proportioning minute quantities of a first fluid, such as concentrated cleaning solution, for mixing with a second fluid, such as tap water, the dilution apparatus 20 adapted to impose a pressure drop between a first fluid supply and a second fluid supply. Those skilled in the art will appreciate that the implementation of the present invention herein can be varied, and that the invention is described in an illustrative embodiment. Accordingly, additions and modifications can be made, and details of various embodiments can be interchanged, without departing from the principles and intentions of the invention.

For example, although the dilution disks 50a–50f have been described as being made of elastomeric material, many other materials and methods of manufacture may be used, including rigid materials and/or those requiring machining. Such alternatives may be especially appropriate if chemicals to be passed through the tortuous path 52a–52f have specific reactive characteristics or are of a high temperature or pressure.

As a further example, the tortuous path 52a–52f described herein is formed on a downstream, front face 54a–54f of the dilution disks 50a–50f. However, similar tortuous paths 52a–52f could be incorporated internal to each dilution disk 50a–50f, on the upstream, back face 55a–55f, or on both faces 54a–54f, 55a–55f.

As another example, the embodiment shown in FIGS. 4 and 6 had the plurality of dilution disks 50a–50f in the engaged position with their positioning tabs 60a–60f at the counterclockwise limit of the cutaway 84. Consequently, dilution disks 50b, 50d and 50f cannot be rotated counterclockwise to their bypass positions and thus only dilution disks 50a, 50c or 50f can be rotated clockwise to accomplish bypass. Consequently, positioning tabs 60b, 60d and 60f could be deleted to prevent inadvertent positioning of the corresponding dilution disks 50b, 50d or 50f to a clockwise position that would interrupt serial flow 48. In addition, alignment tabs 61b, 61d and 61f may be enlarged to substantially encompass alignment groove 78 to prevent rotation of dilution disks 50b, 50d or 50f.

Alternatively, the engaged position of dilution disks 50a–50f could be achieved with the positioning tabs 60a–60f centered within the cutaway 84. The variation in the positioning tabs would indicate the direction of travel to place the disk in bypass. The radial position of the respective alignment tabs 61a, 61c and 61e would advantageously allow rotation from the centered position to the clockwise bypass position, but not counterclockwise to the interrupted position for dilution disks 50a, 50c and 50e. Similarly, alignment tabs 61b, 61d and 61f would advantageously allow rotation from the centered position to the counterclockwise bypass position but not clockwise to the interrupted position for dilution disks 50b, 50d and 50f.

In addition, the tortuous path 52a–52f may be varied in pattern and amount of surface area utilized of a dilution disk. Moreover, tortuous paths 52a–52f of varied length, number of sharp turns and/or cross-section flow area may be provided so that a broad range of flow characteristics may be achieved. Also, although the housing assembly 70 shown was configured to use six dilution disks 50a–50f, other housing assemblies would be appropriate to vary the number of disks. Furthermore, although the stack of dilution disks 50a–50f are shown advantageously held together under compression, the dilution disks 50a–50f may be fastened or otherwise joined together in a more permanent fashion, as is generally understood. In addition, the dilution disks 50a–50f need not be generally circular, but other shapes such as square. Similarly, positioning the dilution disks 50a–50f may alternatively be by linearly translating rather than rotating.

Also, the ability to vary the length of the channel formed by the series alignment of a plurality of tortuous paths 52a–52f is shown as being discrete increments, that is entire tortuous paths 52a–52f of certain dilution disks 50a–50f are bypassed. As would be appreciated, the length of the channel may be varied in a more continuous fashion, such as having the output port 56a–56f positionable along a number of points along the preceding tortuous path 52a–52f rather than only at a blind intake 58a–58f.

These and other advantages and modifications will become readily apparent to those of ordinary skill in the art without departing from the scope of this invention. The applicant intends to be bound only by the scope of the claims which follow and equivalents thereof.

What is claimed is:

1. A fluid dispersing apparatus, comprising:
   a first fluid supply;
   a second fluid supply; and
   a proportioner for controlling the combination of one volume of a first proportioned fluid from the first fluid supply into another larger volume of a second fluid from the second fluid supply, the proportioner including:
      at least two channel carriers, at least one channel carrier having a face in sliding contact with a face of another channel carrier;
      each channel carrier comprising a channel segment having a tortuous path, said tortuous path having a blind end and a through port end;
      each channel carrier also comprising a through port communicating with said through port end;
      each channel carrier being slidably moveable with respect to another channel carrier between a channel segment engaged position and a channel segment bypass position, said carrier being in a channel segment engaged position when the blind end of the channel therein is in fluid communication with a through port of another channel carrier, said carrier being in a channel segment bypass position when the through port thereof is aligned with the through port of another channel carrier disposed operably upstream thereof; and
      an operative proportioning channel for said proportioner being defined by the channel segments in carriers disposed in the engaged position and by the through ports of carriers disposed in the channel segment bypass position, the channel segments in carriers disposed in the bypass position being operatively disconnected from said proportioning channel.

2. The fluid dispensing apparatus of claim 1, wherein said channel carriers are rotatable with respect to each other between said engaged and bypass positions to vary the overall length of said proportioning channel.

3. The fluid dispensing apparatus of claim 2, wherein a channel segment of said one channel carrier is on a selected face of said one channel carrier with an opposing face of said one channel carrier in fluid communication with the selected face by the through port of said one channel carrier, the opposing face sealingly contacting an adjacent channel segment of said another channel carrier, the adjacent channel segment being in the bypass position when said through port of said one channel carrier is aligned with said through port of said another channel carrier.

4. The fluid dispensing apparatus of claim 3, further including a housing, said channel carriers being operationally mounted within said housing, said housing holding adjacent channel carriers into direct sealing contact with one another.

5. The fluid dispensing apparatus of claim 4, wherein a selected channel carrier includes a positioning tab, and wherein said housing includes a window exposing a portion of said selected channel carrier including said positioning tab allowing verification of the position of said selected channel carrier.

6. The fluid dispensing apparatus of claim 5, wherein said housing includes a reference corresponding to the exposed portion of said selected channel carrier.

7. The fluid dispensing apparatus of claim 1, wherein the first proportioned fluid has particles and each of said channel segments has a cross sectional area larger than particles in the first proportioned fluid such that particles in the first proportioned fluid tend to pass through said proportioning channel into the second fluid without blocking flow of the first proportioned fluid.

8. The fluid dispensing apparatus of claim 1, wherein the tortuous path of a selected channel segment has a predetermined number of sharp turns to produce a selected pressure drop, and wherein a pressure drop associated with said operative proportioning channel provides for an ultra-lean dilution of the first proportioned fluid into the second proportioned fluid, said ultra-lean dilution comprising about one part of the first proportioned fluid to about 350 parts to about 1500 parts of the second proportioned fluid.

9. The fluid dispensing apparatus of claim 1, further comprising a housing selectively locking said face of said at last one channel carrier in contact with said face of said another channel carrier.

10. The fluid dispensing apparatus of claim 9, wherein said housing includes an alignment groove and wherein a selected first channel carrier includes an alignment tab cooperating with said alignment groove in said housing to constrain a first channel carrier in the engaged position.

11. The fluid dispensing apparatus of claim 10, wherein a selected second channel carrier includes an alignment tab cooperating with said alignment groove in said housing to constrain said second channel carrier in one of the engaged and bypass positions.

12. The fluid dispensing apparatus of claim 9, wherein said housing includes an inner housing and an outer housing, said inner housing and said outer housing allowing for insertion of said channel carriers into said housing.

13. The fluid dispensing apparatus of claim 12, wherein said housing further includes an inlet body held in physical contact with a selected channel carrier by engageable contact between said inner housing and said outer housing.

14. The fluid dispensing apparatus of claim 1, wherein the first fluid supply comprises a reservoir containing a nonpressurized volume of the first proportioned fluid, and wherein the second fluid supply comprises a fluid connector configured for coupling to a supply conduit for receiving a pressurized volume of the second proportioned fluid.

15. The fluid dispensing apparatus of claim 1, further comprising:
   an eductor coupled to the proportioner to receive the volume of the first proportioned fluid and coupled to the first fluid supply for receiving a motive volume of the second proportioned fluid.

16. The fluid dispensing apparatus of claim 15, wherein the eductor comprises an air gap eductor.

17. A fluid dispensing apparatus, comprising:
   a reservoir configured to contain a nonpressurized volume of a first proportioned fluid;
   a fluid connector configured to receive a larger, pressurized volume of a second proportioned fluid from a supply conduit;

a proportioner for controlling the combination of the nonpressurized volume of the first proportioned fluid from the reservoir into the larger, pressurized volume of the second fluid from the fluid connector, the proportioner including:

at least two channel carriers, at least one channel carrier having a face in sliding contact with a face of another channel carrier;

each channel carrier comprising a channel segment having a tortuous path and a through port;

at least one channel carrier being slidably moveable with respect to another channel carrier between a channel segment engaged position and a channel segment bypass position; and an operative proportioning channel for the proportioner being defined by the channel segment in carriers disposed in the engaged position and by the through ports of carriers disposed in the channel segment bypass position, the tortuous paths in carriers disposed in the bypass position being operatively disconnected from said proportioning channel; and an eductor coupled to receive the pressurized volume of the second proportioned fluid as a motive fluid and coupled to receive the first proportioned fluid from the proportioner.

18. A method of proportioning minute quantities of a first fluid for mixing with a second fluid in a fluid dispensing apparatus including a proportioner for controlling the combination of one volume of the first proportioned fluid into another larger volume of the second fluid, wherein the proportioner includes at least two channel carriers, at least one channel carrier having a face in sliding contact with a face of another channel carrier; each channel carrier comprising a channel segment having a tortuous path, the tortuous path having a blind end and a through port end; each channel carrier being slidably moveable with respect to another channel carrier between a channel segment engaged position and a channel segment bypass position; the carrier being in a channel segment engaged position when the blind end of the channel therein is in fluid communication with a through port of another channel carrier, the carrier being in a channel segment bypass position when the through port thereof is aligned with the through port of another channel carrier disposed operably upstream thereof; and an operative proportioning channel for the proportioner being defined by the channel segments in carriers disposed in the engaged position and by the through ports of carriers disposed in the channel segment bypass position, the channel segments in carriers disposed in the bypass position being operatively disconnected from the proportioning channel, the method comprising:

moving at least one of the plurality of channel carriers within the proportioner to vary the length of the operative proportioning channel for altering a pressure drop achieved by the operative proportioning channel during the proportioning of the first fluid into the second fluid; and educting the first fluid into the second fluid by a motive force provided by the second fluid.

19. The method of claim 18, wherein the movement of the plurality of channel carriers is constrained within a housing.

20. The method of claim 18, wherein the moving of least one of the plurality of channel carriers comprises rotating at least one of the plurality of channel carriers with respect to the remaining channel carriers.

21. The method of claim 18, further comprising:

storing a nonpressurized volume of the first proportioned fluid; and receiving a pressurized volume of the second proportioned fluid from a supply conduit.

* * * * *